(No Model.) 2 Sheets—Sheet 1.

N. J. VINYARD.
GRAIN AND SEED SEPARATOR.

No. 409,256. Patented Aug. 20, 1889.

WITNESSES

INVENTOR
Nicholas J. Vinyard
By J. P. and S. J. Wright
Attorneys (No Model.)  2 Sheets—Sheet 2.
N. J. VINYARD.
GRAIN AND SEED SEPARATOR.

No. 409,256.  Patented Aug. 20, 1889.

WITNESSES  
INVENTOR  
Nicholas J. Vinyard  
By J. P. and S. S. Wright  
Attorneys

UNITED STATES PATENT OFFICE.

NICHOLAS J. VINYARD, OF VINTON, VIRGINIA.

GRAIN AND SEED SEPARATOR.

SPECIFICATION forming part of Letters Patent No. 409,256, dated August 20, 1889.

Application filed February 23, 1889. Serial No. 300,988. (No model.)

*To all whom it may concern:*

Be it known that I, NICHOLAS J. VINYARD, residing at Vinton, in the county of Roanoke and State of Virginia, have invented certain new and useful Improvements in Grain and Seed Separators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to grain-separators; and the object of the invention is to provide a simple, cheap, and durable separator for all kinds of grain or seed, which can be regulated according to the force of the wind from a fan.

A further object of the invention is to provide a separator constructed so as to be used in conjunction with any mill or machine for cleaning and separating grain.

Figure 1:
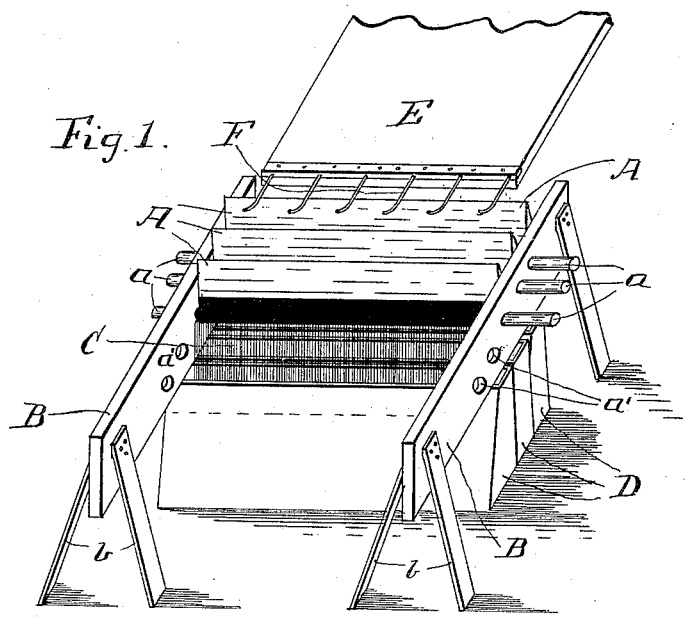
Figure 2:
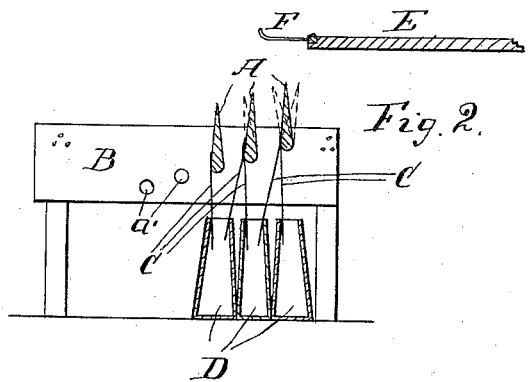
Figure 3:
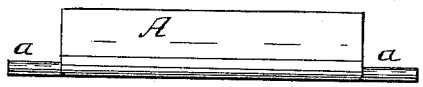
Figure 4:
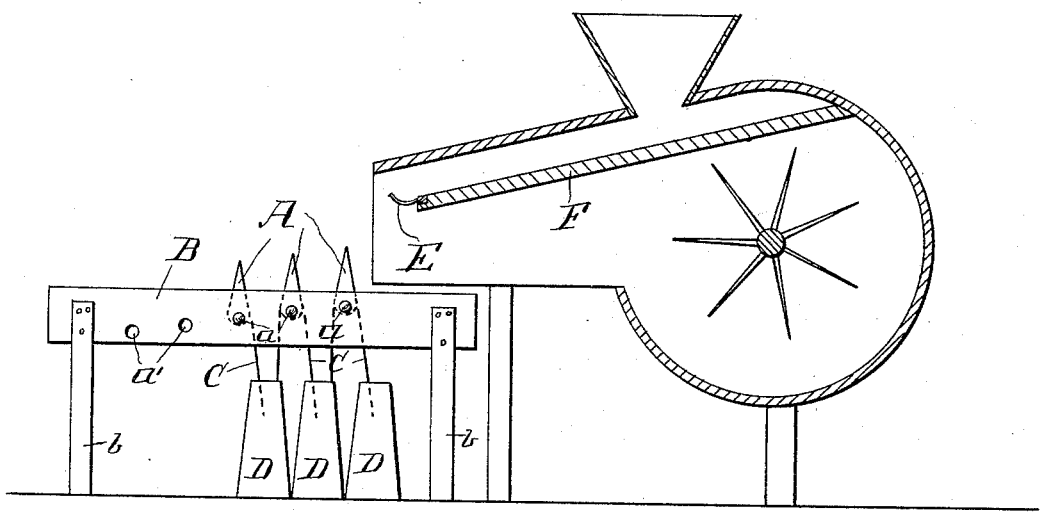

In the annexed drawings, Figure 1 is a perspective view showing the improved separator and part of an ordinary shaker-board. Fig. 2 is a section of the device, and Fig. 3 is a detail view of one of the blades. Fig. 4 is a sectional view of a fan-blower, showing my improved separator in side elevation.

Like letters of reference denote like parts in the several figures.

The separator-blades A are provided at each lower end with projections $a$, which fit into and extend through the perforations $a'$ in the sides of the trestle B, to enable the attendant to regulate the said blades according to the force of the wind. The said projections may or may not be provided with knobs or handles. The perforations are arranged in step-like form along the frame, so that the blades when in position also appear in step-like form. The blades are provided with aprons C, the upper edges of which are glued or otherwise attached to the said blades, while the lower edges hang down and extend into the top of the receptacle D, thereby acting as guides for the grain on its descent into the said hoppers.

The receptacle D is situated directly under the blades A, and is made smaller at the top than at the bottom—that is, the top of each receptacle is just as wide as the space between the blades. The sides of the blades A may be made straight, with sharpened upper edges; but I prefer to make them as shown in the drawings.

The trestle-frame B is supported by suitable legs $b$ at either end, or it may be attached directly to a machine, but is preferably placed on the ground or floor, so that it may be adjusted back and forth, according to the force of the wind from a fan, instead of moving the pivoted blades.

The rake F is attached to the shaker E just where the grain falls off, as clearly shown in Fig. 1. The said rake is employed to catch the straw, hay, or weeds and prevent them from falling onto the blades.

The operation of the device is as follows: The trestle supporting the blades is placed on the ground or floor at the end of an ordinary shaker, with the first blade almost under the end thereof, and as the grain is shaken off the wind from the fan carries it on to the first blade. The first blade, or the one nearest the shaker, guides the heavy or good grain into the first receptacle, or the one nearest the shaker. The second blade controls the heavy refuse, and the third the light waste, &c. Each blade, with the assistance of the aprons, carries its charge into the respective receptacle. In case the force of the wind is very great, in which case the wind would drive the grain which should go into the receptacle nearest the shaker over into the farthest receptacle, the attendant has simply to turn the projections $a$ little from the shaker, which will slant the blades in the same direction, catch the grain, and drop it into the hopper the same as when under regular wind. When the force of the wind is very slight, by turning the projections in the opposite direction the same result is accomplished.

What I claim as new, and desire to secure by Letters Patent, is—

1. In a portable grain-separator, the combination, with the blast-fan, its casing, and the feed-board, of the grading device comprising the trestles B, having the perforations $a'$, the removable wings or dividers A, having the trunnions $a$, and the separate receptacles D, adapted to be placed beneath the dividers, substantially as and for the purpose set forth.

2. In a portable grain-separator, the combination of the blast-fan, the feed-board, the trestles perforated as described, the wings having each one or more aprons or dividers C, and the boxes D, made narrower at the top than at the bottom, substantially as shown, and for the purpose set forth.

3. In a portable grain-separator, the combination, with the blast-fan, its casing, and the feed-board, of the grading device comprising the trestles B, having each an inclined series of perforations $a'$, the removable wings or dividers A, having trunnions $a$, and the receptacles D, substantially as set forth.

In testimony whereof I affix my signature in presence of two witnesses.

NICHOLAS J. VINYARD.

Witnesses:
ROBINSON WHITE,
C. T. BEER.